US009086863B2

(12) United States Patent
Lamy

(10) Patent No.: US 9,086,863 B2
(45) Date of Patent: Jul. 21, 2015

(54) OPTIMALLY SORTING A LIST OF ELEMENTS BASED ON THEIR SINGLETONS

(71) Applicant: Continental Automotive Systems, Inc., Auburn Hills, MI (US)

(72) Inventor: Guillaume Lamy, Chicago, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 329 days.

(21) Appl. No.: 13/646,816

(22) Filed: Oct. 8, 2012

(65) Prior Publication Data

US 2013/0166281 A1  Jun. 27, 2013

Related U.S. Application Data

(60) Provisional application No. 61/579,011, filed on Dec. 22, 2011.

(51) Int. Cl.
*G06F 7/24* (2006.01)
*G10L 15/065* (2013.01)

(52) U.S. Cl.
CPC .................. *G06F 7/24* (2013.01); *G10L 15/065* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .......................... 704/1, 9, 10; 707/706–708
See application file for complete search history.

(56) References Cited

U.S. PATENT DOCUMENTS

| | | | | |
|---|---|---|---|---|
| 5,835,893 A | * | 11/1998 | Ushioda | 704/257 |
| 2008/0300857 A1 | * | 12/2008 | Barbaiani et al. | 704/4 |
| 2011/0010163 A1 | * | 1/2011 | Jansen | 704/9 |
| 2013/0138428 A1 | * | 5/2013 | Chandramouli et al. | 704/9 |

* cited by examiner

*Primary Examiner* — Lamont Spooner

(57) ABSTRACT

A method provides a non-optimized list of elements, with some of the elements having multiple terms. A table of sub-elements is generated from the elements list, with each sub-element having one term only and with a number of times a sub-element appears in the elements list being weighted in the sub-elements table. A weighted singleton histogram table is generated using a singleton dictionary, and a total popularity score of each singleton is computed from the sub-elements table. For each element from the elements list, an elements score is generated based on the total popularity score of each singleton within the element. An optimally sorted list of the elements list is generated based on the elements scores.

18 Claims, 3 Drawing Sheets

US 9,086,863 B2

OPTIMALLY SORTING A LIST OF ELEMENTS BASED ON THEIR SINGLETONS

FIELD

This invention relates to any group of elements needing optimal coverage of their sub-elements or singletons and, more particularly, to a method for creating an optimally sorted list of elements based on their singletons to maximize the singletons coverage in a minimum number of elements.

BACKGROUND

There are many applications where a group of elements need optimal coverage of their singletons. One such application is speech recognition optimization. A speech recognition system uses a specific set of commands for which recognition accuracy can be improved through supervised adaptation. During a supervised adaptation, a user will speak a list of commands which in turn will be used by the speech engine to update its model. For supervised adaptation, there is a need to provide an optimally ordered list to minimize the number of training commands necessary to fully cover the phonetic content of the overall system, and at any given time during the supervised adaptation, to ensure that the largest possible phonetic coverage has been trained.

In the case of unsupervised adaptation, where the speech engine is continuously adapting to a user's voice, there is need to limit the unsupervised adaptation to an optimized subset of commands to minimize risk of over-training, by stopping unsupervised adaptation when optimum set of commands has been met, and to accelerate adaptation based on a subset of commands only.

SUMMARY

An object of the invention is to fulfill the needs referred to above. In accordance with the principles of the present invention, this objective is achieved by a method for sorting a list of elements. The method provides a non-optimized list of elements, with some of the elements having multiple terms. A processor circuit generates a table of sub-elements from the elements list, with each sub-element having one term only and with a number of times a sub-element appears in the elements list being weighted in the sub-elements table. The processor circuit generates a weighted singleton histogram table using a singleton dictionary, and computes a total popularity score of each singleton from the sub-elements table. For each element from the elements list, the processor circuit generates an elements score based on the total popularity score of each singleton within the element. The processor circuit generates an optimally sorted list of the elements list based on the elements scores.

In another embodiment an apparatus for sorting a list of elements includes a processor circuit configured for generating a table of sub-elements from an elements list, with each sub-element having one term only and with a number of times a sub-element appears in the elements list being weighted in the sub-elements table. The processor circuit is configured for generating a weighted singleton histogram table using a singleton dictionary, and computing a total popularity score of each singleton from the sub-elements table. The processor circuit is configured for generating for each element from the elements list, an elements score based on the total popularity score of each singleton within the element. The processor circuit is configured for generating an optimally sorted list of the elements list based on the elements scores. A memory circuit is configured for storing the table of sub-elements, the weighted singleton histogram, the elements scores, and any optimized list.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
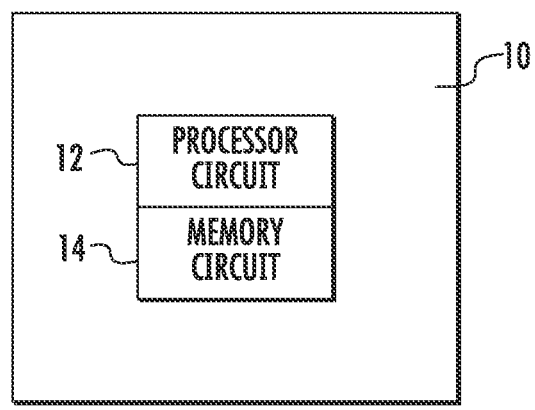
FIG. 1 illustrates an apparatus for executing optimal sorting of a list of elements based on their singletons, in accordance with an example embodiment.

FIG. 1 illustrates an example apparatus 10 for executing a process for sorting of a list of elements based on their singletons, according to an example embodiment. The apparatus 10 is a physical machine (i.e., a hardware device) that can be implemented in the form of a computer. The apparatus includes a processor circuit 12 and a memory circuit 14.

The processor circuit 12 and the memory circuit 14 (and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 14) causes the integrated circuit(s) implementing the processor circuit 12 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 14 can be implemented, for example, using a non-transitory non-volatile memory such as a programmable read only memory (PROM) or an EPROM, and/or a volatile memory such as a DRAM, etc.

Figure 2:
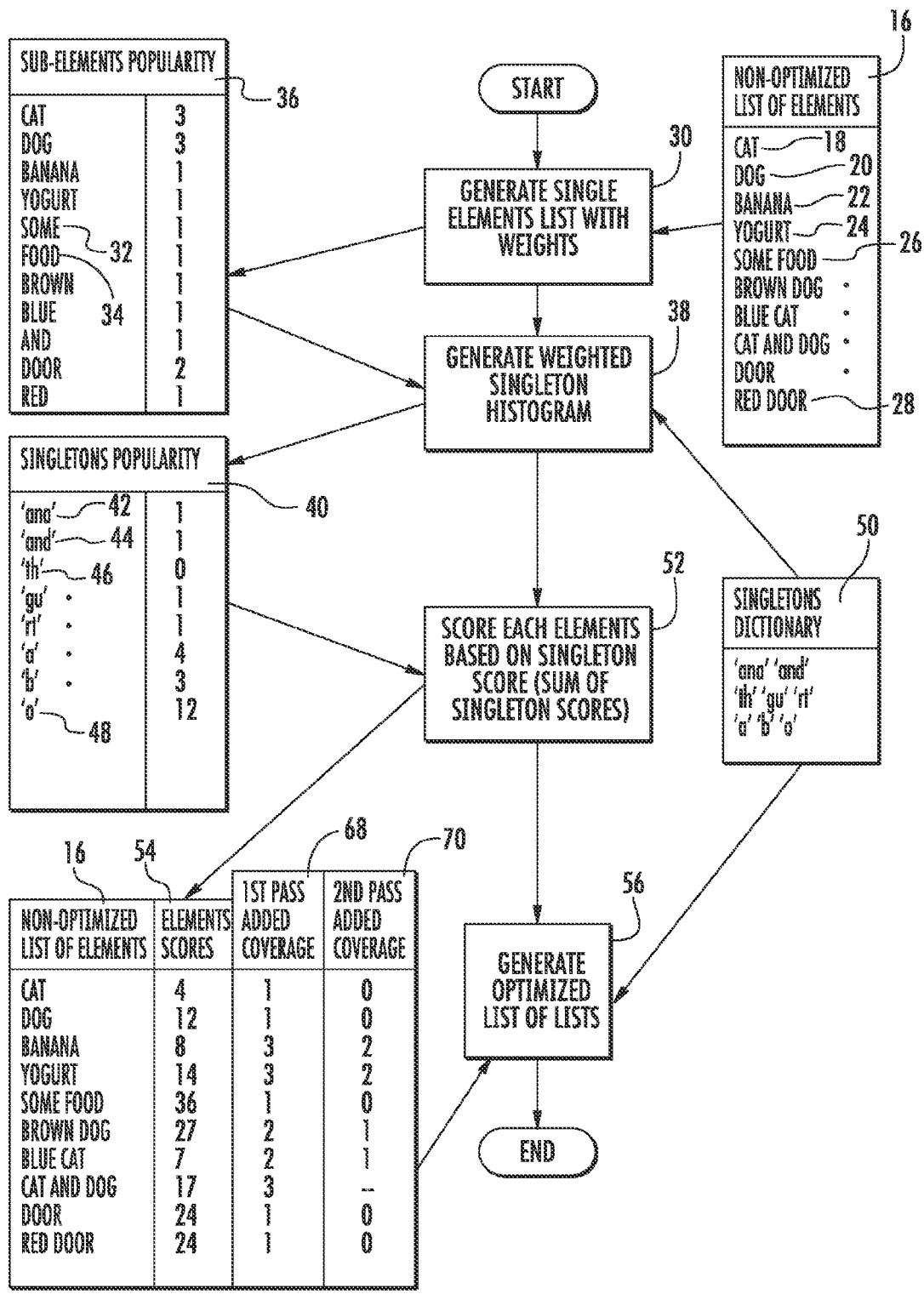
FIG. 2 illustrates a method executed by the apparatus of FIG. 1, in accordance with an example embodiment.

With reference to FIG. 2, a method for optimally sorting a list of elements based on their singletons to maximize the singletons coverage in a minimal number of elements is shown according to an example embodiment. The steps described in FIG. 2 can be implemented as executable code stored on a computer or machine readable non-transitory tangible storage medium (e.g., floppy disk, hard disk, ROM, EEPROM, nonvolatile RAM, CD-ROM, etc.) that are performed based on execution of the code by the processor circuit 12 implemented using one or more integrated circuits; the steps described herein also can be implemented as executable logic that is encoded in one or more non-transitory tangible media for execution (e.g., programmable logic arrays or devices, field programmable gate arrays, programmable array logic, application specific integrated circuits, etc.).

First, a non-optimized list 16 of elements 18, 20, 22, 24, 26, . . . 28 is provided with some of the elements having multiple terms (e.g., element Some food 26). In step 30, a table of sub-elements elements (one term only) with weights is generated by the processor circuit 12 from the list 16. An element 18, 20, etc. can be made of sub-elements. For example, element "Some food" 26 in list 16 is made up of sub-elements "Some" 32 and "food" 34 as shown in sub-element table 36. The sub-element table 36 includes a list of unique single sub-elements, with the number of times a sub-element appears in the elements list 16 being weighted. In the illustrated example, "cat" appears three times in list 16. Therefore, this sub-element has a sub-element weight or score of 3 in table 36.

In step 38, a weighted singletons histogram table 40 is generated by the processor circuit 12. As shown in table 40, in step 38, the popularity score of each singleton 42, 44, 46 . . . 48 of a singleton dictionary 50 (preferably stored in the memory circuit 14) is computed based on the sub-elements table. The singletons 42, 44, 46, . . . 48 are first ordered from the largest total characters to the smallest total characters, since a "large" singleton can be made of "smaller" singletons. A small singleton should not increase its popularity if it is part of a larger singleton. Proceeding through the list from largest sized singletons (e.g., 42) to the smallest singleton (e.g., 48), each singleton receives a popularity score equal to its number of repetition within a sub-element (see table 36) times the weight of this sub-element. A total popularity score of a singleton is computed by adding up the popularity scores it received from all of the sub-elements of the sub-elements table 36.

In the embodiment as shown in table 40, 'ana' received a score of '1' because it is part only of "banana" which weighted '1' in table 36. On the other hand, 'a' receives a score of '4' because it is part of "cat" (1×3=3), "banana" (only one 'a' is counted because 'ana' was already counted, thus 1×1=1), and "and" but this 'a' is not counted because 'and' was already counted. Thus, the total score of 'a' is 3+1=4, although 'a' appears seven times in the elements list 16. Finally 'o' receives a score of 12 since "Dog": 1×3=3, "Yogurt": 1×1=1, "Some": 1×1=1, "food": 2×1=2, "Brown": 1×1=1, "Door": 2×2=4, wherein 4+1+2+1+1+3=12.

In step 52, the processor circuit 12 scores each element (of list 16) based on the total singletons popularity score (table 40). Thus, the processor circuit 12 adds-up the score of each singleton within an element, starting from the largest singleton. The processor circuit 12 gives each element its popularity score based on the popularity of its singletons, as shown in table 54. For example, although "dog" is a short element of the list 16, it has a large popularity score (e.g., 12) due to the fact that 'o' has this large score in table 40.

Figure 3:
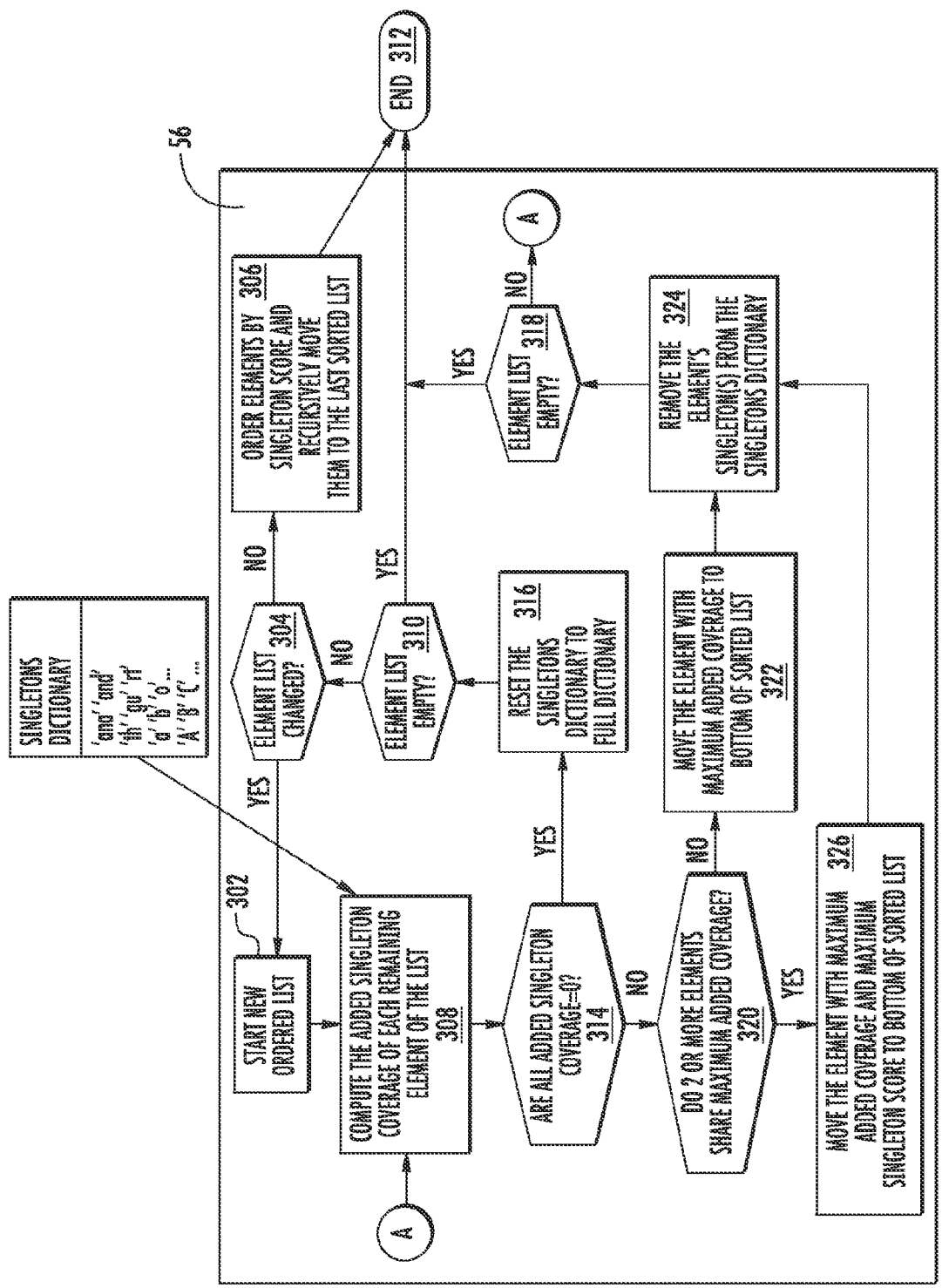
FIG. 3 illustrates detailed steps of the step 56 of FIG. 2.

An optimally sorted list of the list 16 of elements is generated by the processor circuit 12 in step 56 based on the elements scores (table 54). FIG. 3 illustrates the details of step 56. A new ordered list is started at 302. The added singleton coverage of each remaining element of the list is computed at 308. A determination is made at 314 with respect to whether all added singleton coverage equals 0. If all added singleton coverage equals 0, the singletons dictionary is reset to the full dictionary at 316. A determination is then made at 310 with respect to whether the element list is empty. If the element list is determined at 310 to be empty, then the process ends at 312. Otherwise, if the element list is determined at 310 to be not empty, then a determination is made at 304 with respect to whether the element list changed. If it is determined at 304 that the element list changed, then processing returns to step 302. Otherwise, if it is determined at 304 that the element list has not changed, then elements are ordered by singleton score and are recursively moved to the last sorted list at 306, and then the process ends at 312.

If it was determined at 314 that all added singleton coverage does not equal 0, then a determination is made at 320 with respect to whether 2 or more elements share maximum added coverage. If it is determined at 320 that 2 or more elements share maximum added coverage, then the element with maximum added coverage and maximum singleton score is moved to the bottom of the sorted list at 326. Otherwise, if it is determined at 320 that 2 or more elements do not share maximum added coverage, then the element with maximum added coverage is moved to the bottom of the sorted list at 322. After either step 322 or step 326, the element's one or more singletons are removed from the Singletons Dictionary at 324. A determination is then made at 318 with respect to whether the element list is empty. If it is determined at 318 that the element list is empty, then the process ends at 312. Otherwise, if it is determined at 318 that the element list is not empty, then the process returns to 308 at which the added singleton coverage of each remaining element of the list is computed.

As an example of generating the optimized lists of lists:
First Pass

Returning to FIG. 2 and with reference to table 68, "Cat" only adds 1 to the coverage of singletons, because it only contains "a" from the singleton list, but "Banana" adds 3 because it contains "ana", "a" and "b". After the first pass of the added coverage estimation, "Banana", "Yogurt" and "Cat and dog" elements all have a 3 added coverage score.

Note how although "Some food" contains many of the highly popular "o", it does not bring much coverage and will be discarded at the first pass.

Choosing between "Banana", "Yogurt" and "Cat and dog" is based on their elements scores from table 54:

"Banana" has a score of 8 (1 ("ana")+4 ("a")+3 ("b"))

"Yogurt" has a score of 14 (12 ("o")+1 ("gu")+1 ("rt"))

"Cat and dog" has a score of 17 (12 ("o")+1 ("and")+4 ("a"))

Therefore "Cat and dog" is chosen and added as the first element of the list that brings the most information.
Second Pass As shown in table 70, "Cat and dog" singletons "o", "and" and "a" do not count toward the next added coverage estimation (second pass). As a matter of fact, "Yogurt" and "Banana" still bring the most added coverage with a score of 2 each, although it is not always the case that the first elements of the first pass will find themselves in the second pass. Since "Banana" has an elements score of 8 and "Yogurt" has an elements score of 14, "Yogurt" is the second element to be chosen.

Third Pass

Singletons "o", "and", "a", "gu", and "rt" do not count towards the next added coverage estimation (third pass). Thus the coverage will be:

Cat→0
Dog→0
Banana→2
Some food→0
Brown dog→1
Blue cat→1
Door→0
Red door→0

"Banana" is the only element with a score of 2; it is thus chosen to be the third elements of the sorted list.

Fourth Pass

Singletons "o", "and", "a", "gu", "rt", "ana" and "b" do not count towards the next added coverage estimation (fourth pass) and the coverage will be:

Cat→0
Dog→0
Some food→0
Brown dog→0
Blue cat→0
Door→0
Red door→0

As seen in the list above, no elements can add to the coverage. This ends the first list and a new optimized sorted list has to be created. It is noted that not all singletons have been covered by the optimized list: "th" does not exist in any of the elements and will therefore never impact the estimation.

Fifth Pass

All singletons are back into the estimation and the coverage will be:

Cat→1
Dog→1
Some food→1
Brown dog→2
Blue cat→2
Door→1
Red door→1

"Some food" has an elements score of 36, but because it only brings 1 singleton coverage, it is not picked up in this pass. "Brown dog" (elements score 27) is chosen over "Blue cat" (elements score 7) and becomes the first element of the second sorted list.

Sixth Pass

Singletons "o" and "b" do not count towards the next added coverage estimation (sixth pass) and coverage will be:

Cat→1
Dog→0
Some food→0
Blue cat→1
Door→0
Red door→0

"Blue cat" (elements score 7) is chosen over "cat" (elements score 4). Thus, "Blue cat" is the second element of the second ordered list.

Seventh Pass

Singletons "o", "b" and "a" do not count towards the next added coverage estimation (seventh pass) and the coverage will be:

Cat→0
Dog→0
Some food→0
Door→0
Red door→0

As seen in the list above, no elements can add to the coverage. Thus, this ends the second ordered list and a new optimized sorted list has to be created. It is noted that not all singletons have been covered by the optimized list: "th", "rt", "gu" etc . . . don't exist in any of the remaining elements and will not impact the coverage estimation anymore. However, since the popularity score of each element takes them into account, they still impact the optimized order.

Eighth Pass

All singletons are back into the estimation and the coverage will be:

Cat→1
Dog→1
Some food→1
Door→1
Red door→1

All remaining elements bring the same coverage addition, but "Some food" has the highest score. Thus, "Some food" is the first element of the third ordered list.

Ninth Pass

Singleton "o" does not count towards the next added coverage estimation ninth pass) and the coverage will be:

Cat→1
Dog→0
Door→0
Red door→0

Since only "cat" brings coverage, it is the second and last element of the third ordered list.

The last ordered elements will be:
1) "Red door"
2) "Door"
3) "Dog"

In the example, the final, optimally sorted list method will be:

List 1:
Cat and dog
Yogurt
Banana
List 2:
Brown dog
Blue Cat
List 3:
Some food
Cat
List 4:
Red door
List 5:
Door
List 6:
Dog It is noted that "Some food", which had a very high popularity score, ended up in the third list. The reason for this is that although "Some food" has a popular singleton, its coverage is less than an element which brings less popular singletons, but a greater variety of singletons.

The output of the steps of FIG. 2 would have changed significantly if the singleton list was slightly different; for example, if the singleton list had "me", "Some food" would have been part of the first list.

The memory circuit 14 is configured for storing any data needed during execution of the steps of FIG. 2. For example, the memory circuit 14 can store the table of sub-elements, the weighted singleton histogram, the elements scores, and any optimally sorted list.

In accordance with an embodiment of the invention, implementation of an algorithm for an optimized speaker adaptation list of commands (supervised or unsupervised) also takes into account that commands may be made of multiple and overlapping phonetic transcriptions. In order to avoid an artificial inflation of some singleton scores in the case where a command has many different phonetic transcriptions, each of which is overlapping largely with the others, it was decided that the element would become the combination of its unique singletons. For example "cat" can be written "Cat", "cAt", "caT", ... which would artificially inflate 'a', 'c', 'f', 'A', 'C' and 'T'. The algorithm considers "cat" actually as "CcAaTt".

Embodiments have been described with reference to a speech recognition system that uses a specific set of commands for which recognition accuracy can be improved through supervised adaptation. During a supervised adaptation a user will speak a list of commands which in turn will be used by the speech engine to update its model. An optimally ordered list as provided by the disclosed method could minimize the number of training commands necessary to fully cover the phonetic content of the overall system. In addition, at any given time during the supervised adaptation, the largest possible phonetic coverage is trained.

In the case of unsupervised adaptation where a speech engine is continuously adapting to a user's voice, disclosed embodiments could limit the unsupervised adaptation to an optimized subset of commands to minimize risk of overtraining, by stopping unsupervised adaptation when an optimum set of commands has been met and accelerate adaptation based on a subset of commands only.

While embodiments are disclosed in a context involving mainly speech recognition optimization, embodiments may be employed with regard to any group of elements needing optimal coverage of their sub-elements (singletons). For example, embodiments may be used for finding the optimal ordering of books to cover the maximum number of a set of sentences or words in a minimum number of books, based on the popularity of the words, sentences and the books themselves.

Embodiments of the invention provide the advantage that they are flexible when defining the singletons for which the coverage will be optimal. Methods according to embodiments of the invention not only output an optimal list, but actually produce an optimal list of lists. For example, if the maximum coverage of sentences has been achieved in 53 books, but the original book list contained 100 books, then the method looks at the 47 remaining books and determines another optimal list. Of course, the 47 remaining books can or cannot cover the entire coverage of sentences; in case it cannot, a method according to an embodiment finds the minimum number of remaining books to get the maximum sub-coverage, and then proceeds to the next optimal list, and so on, until all of the 100 books are properly ordered.

The foregoing embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method for sorting a list of elements, the elements being adapted for use in improving recognition accuracy of a speech-recognition system through at least one of supervised adaptation and unsupervised adaptation, the method comprising:

providing a non-optimized list of elements, with some of the elements having multiple terms, generating, by a processor circuit, a table of sub-elements from the elements list, with each sub-element having one term only and with a number of times a sub-element appears in the elements list being weighted in the sub-elements table, generating, by the processor circuit, a weighted singleton histogram table using a singleton dictionary, and computing a total popularity score of each singleton from the sub-elements table, for each element from the elements list, generating by the processor circuit, an elements score based on the total popularity score of each singleton within the element, and generating, by the processor circuit, an optimally sorted list of the elements list based on the elements scores.

2. The method of claim 1, wherein the step of generating the weighted singleton histogram includes: ordering the singletons from a largest total characters to a smallest total characters of the singletons.

3. The method of claim 2, wherein, in the step of computing the total popularity score of each singleton, the popularity of a small character singleton does not increase if it is part of a larger character singleton.

4. The method of claim 3, wherein, in the step of computing the total popularity score of each singleton, a popularity score of each singleton is equal to its number of repetition within a sub-element of the sub-element table multiplied by the weight of the associated sub-element of the sub-elements table, with the total popularity score being computed by adding up the popularity scores from all of the sub-elements in the sub-elements table.

5. The method of claim 1, wherein the step of generating the optimized list further includes performing the following steps in sequence until all elements have been sorted:

a) computing, by the processor circuit, for each element of the elements list, an added singleton coverage increase so that the higher number of singleton the element contains, the higher the coverage increase, b) regardless of the elements score, placing, by the processor circuit, the element with the highest coverage at a bottom of a sorted list, c) repeating steps a) and b) until singleton coverage cannot be increased anymore, d) removing ordered elements from the elements list, and e) repeating step a) until the elements list is fully depleted.

6. The method of claim 5, wherein in the placing step, if several elements have the same coverage increase, the method includes placing the element with highest total popularity score at the bottom of the sorted list.

7. Logic encoded in one or more non-transitory tangible media for execution and when executed operable for:

providing a non-optimized list of elements, with some of the elements having multiple terms, the elements being adapted for use in improving recognition accuracy of a speech-recognition system through at least one of supervised adaptation and unsupervised adaptation, generating, by a processor circuit, a table of sub-elements from the elements list, with each sub-element having one term only and with a number of times a sub-element appears in the elements list being weighted in the sub-elements table, generating, by the processor circuit, a weighted singleton histogram table using a singleton dictionary, and computing a total popularity score of each singleton from the sub-elements table, for each element from the elements list, generating by the processor circuit, an elements score based on the total popularity score of each singleton within the element, and generating, by the processor circuit, an optimally sorted list of the elements list based on the elements scores.

8. The encoded logic of claim 7, wherein the step of generating the weighted singleton histogram includes: ordering the singletons from a largest total characters to a smallest total characters of the singletons.

9. The encoded logic of claim 8, wherein, in the step of computing the total popularity score of each singleton, the popularity of a small character singleton does not increase if it is part of a larger character singleton.

10. The encoded logic of claim 9, wherein, in the step of computing the total popularity score of each singleton, a popularity score of each singleton is equal to its number of repetition within a sub-element of the sub-element table multiplied by the weight of the associated sub-element of the sub-elements table, with the total popularity score being computed by adding up the popularity scores from all of the sub-elements in the sub-elements table.

11. The encoded logic of claim 7, wherein the step of generating the optimized list further includes performing the following steps in sequence until all elements have been sorted:
   a) computing, by the processor circuit, for each element of the elements list, an added singleton coverage increase so that the higher number of singleton the element contains, the higher the coverage increase,
   b) regardless of the elements score, placing, by the processor circuit, the element with the highest coverage at a bottom of a sorted list,
   c) repeating steps a) and b) until singleton coverage cannot be increased anymore,
   d) removing ordered elements from the elements list, and
   e) repeating step a) until the elements list is fully depleted.

12. The encoded logic of claim 11, wherein in the placing step, if several elements have the same coverage increase, the element with highest total popularity score is placed at the bottom of the sorted list.

13. An apparatus for sorting a list of elements, the elements being adapted for use in improving recognition accuracy of a speech-recognition system through at least one of supervised adaptation and unsupervised adaptation, the apparatus comprising:
   a processor circuit configured for generating a table of sub-elements from an elements list, with each sub-element having one term only and with a number of times a sub-element appears in the elements list being weighted in the sub-elements table,
   the processor circuit configured for generating a weighted singleton histogram table using a singleton dictionary, and computing a total popularity score of each singleton from the sub-elements table,
   the processor circuit configured for generating for each element from the elements list, an elements score based on the total popularity score of each singleton within the element,
   the processor circuit configured for generating an optimally sorted list of the elements list based on the elements scores,
   and a memory circuit configured for storing the table of sub-elements, the weighted singleton histogram, the elements scores, and the optimally sorted list.

14. The apparatus of claim 13, wherein the processor circuit is configured, during the generation of the weighted singleton histogram, for ordering the singletons from a largest total characters to a smallest total characters of the singletons.

15. The apparatus of claim 14, wherein, in computing the total popularity score of each singleton, the processor circuit is configured to ensure that the popularity of a small character singleton does not increase if it is part of a larger character singleton.

16. The apparatus of claim 15, wherein, in computing the total popularity score of each singleton, the processor circuit is configured to ensure that a popularity score of each singleton is equal to its number of repetition within a sub-element of the sub-element table multiplied by the weight of the associated sub-element of the sub-elements table, with the total popularity score being computed by adding up the popularity scores from all of the sub-elements in the sub-elements table.

17. The apparatus of claim 13, wherein in generating the optimized list the processor circuit is configured, until all elements have been sorted, for:
   a) computing for each element of the elements list, an added singleton coverage increase so that the higher number of singleton the element contains, the higher the coverage increase,
   b) regardless of the elements score, placing the element with the highest coverage at a bottom of a sorted list,
   c) repeating steps a) and b) until singleton coverage cannot be increased anymore,
   d) removing ordered elements from the elements list, and
   e) repeating step a) until the elements list is fully depleted.

18. The apparatus of claim 17, wherein in the placing step, if several elements have the same coverage increase, the processor circuit is configured for placing the element with highest total popularity score at the bottom of the sorted list.

* * * * *